(12) United States Patent  
Roddis

(10) Patent No.: US 7,857,321 B2  
(45) Date of Patent: Dec. 28, 2010

(54) BEARING PROTECTOR WITH AIR PURGE

(75) Inventor: Alan James Roddis, Sheffield (GB)

(73) Assignee: AES Engineering Ltd., Rotherham (GB)

( * ) Notice: Subject to any disclaimer, the term of this patent is extended or adjusted under 35 U.S.C. 154(b) by 800 days.

(21) Appl. No.: 11/737,481

(22) Filed: Apr. 19, 2007

(65) Prior Publication Data

US 2007/0246893 A1 Oct. 25, 2007

(30) Foreign Application Priority Data

Apr. 19, 2006 (GB) .................. 0607623.6

(51) Int. Cl.  
F16J 15/16 (2006.01)  
F16J 15/447 (2006.01)

(52) U.S. Cl. ...................... 277/412; 277/419

(58) Field of Classification Search ............... 277/346, 277/411, 412, 416–421, 425, 433, 925  
See application file for complete search history.

(56) References Cited

U.S. PATENT DOCUMENTS

| | | | | |
|---|---|---|---|---|
| 4,706,968 | A * | 11/1987 | Orlowski | 277/347 |
| 5,951,020 | A * | 9/1999 | Orlowski | 277/419 |
| 6,062,568 | A | 5/2000 | Orlowski et al. | |
| 6,311,984 | B1 * | 11/2001 | Orlowski | 277/418 |
| 7,461,846 | B2 * | 12/2008 | Chitren | 277/347 |
| 7,521,827 | B2 * | 4/2009 | Orlowski et al. | 310/68 R |
| 2006/0087084 | A1 * | 4/2006 | Chitren et al. | 277/411 |
| 2007/0013142 | A1 * | 1/2007 | Chitren | 277/411 |
| 2007/0145690 | A1 * | 6/2007 | Chitren et al. | 277/411 |
| 2007/0222158 | A1 * | 9/2007 | Roddis | 277/345 |
| 2008/0014076 | A1 * | 1/2008 | Roddis et al. | 415/174.2 |
| 2008/0050261 | A1 * | 2/2008 | Roddis | 418/104 |

FOREIGN PATENT DOCUMENTS

| | | | |
|---|---|---|---|
| GB | 2431440 A * | 4/2007 | |
| GB | 2438022 A * | 11/2007 | |
| WO | WO 2004/005570 A2 | 1/2004 | |
| WO | WO2006/005950 A2 * | 1/2006 | |

\* cited by examiner

*Primary Examiner*—Shane Bomar  
*Assistant Examiner*—Gilbert Y Lee  
(74) *Attorney, Agent, or Firm*—Edwin D. Schindler

(57) ABSTRACT

A bearing seal device has an air purge mechanism that includes a rotor connected to the shaft of a piece of rotating equipment and a stator connected to the housing for the rotating equipment. An air passage extends between an inlet and an outlet and is at least partially defined by circumferentially extending stator and/or rotor surfaces. Preferably, the stator incorporates an orifice, which permits the attachment of an air supply line. The air purge mechanism may include a self-compensating air supply regulator device, located adjacent a circumferential air distribution cavity and substantially adjacent to one or more atmospheric communication orifices. The bearing seal device provides sealing integrity when the shaft is both idle and operational.

17 Claims, 5 Drawing Sheets

BEARING PROTECTOR WITH AIR PURGE

BACKGROUND OF THE INVENTION

1. Technical Field of the Invention

Figure 1:
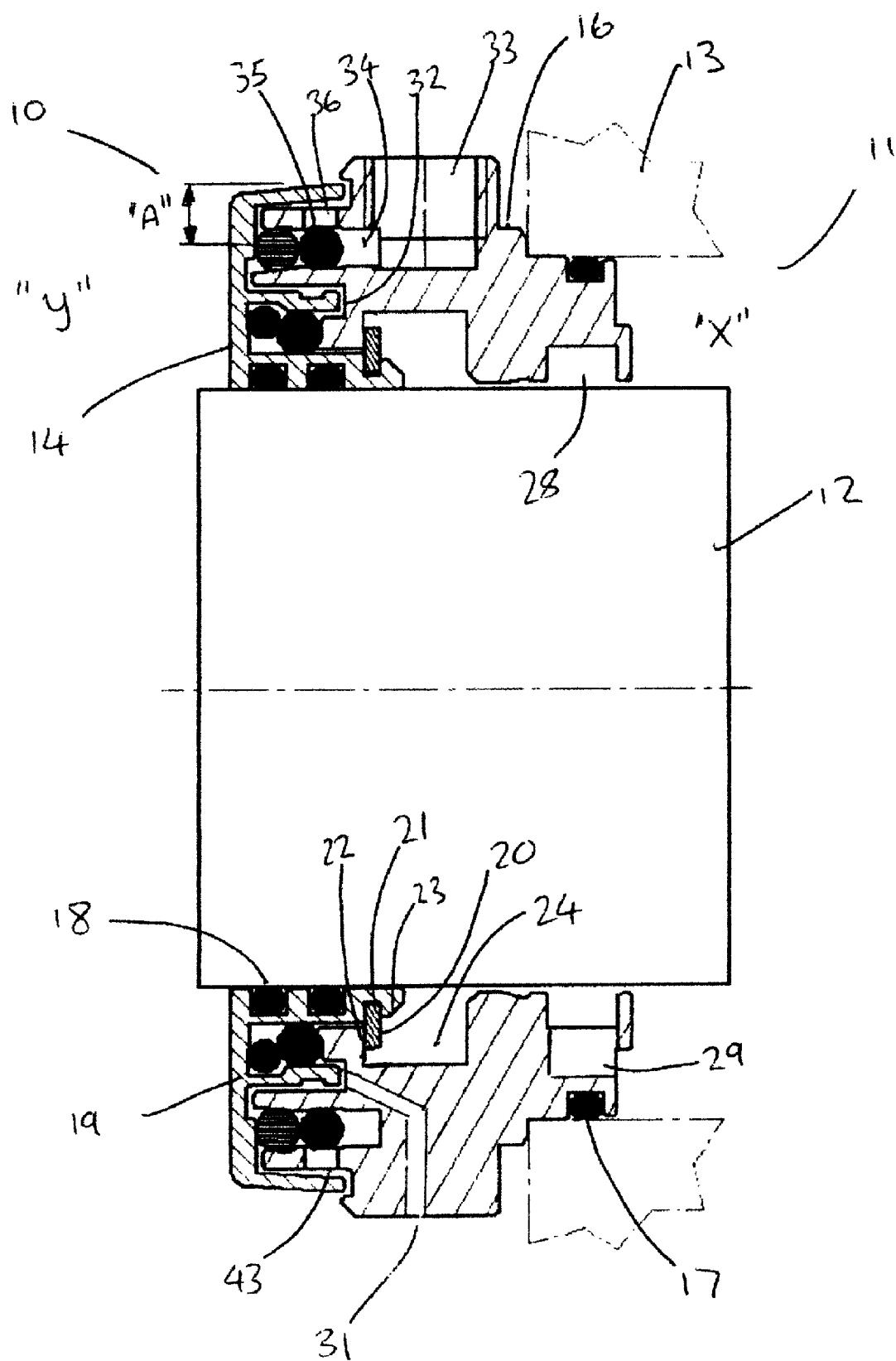

This invention relates to bearing protectors, specifically non-contacting labyrinth seal type and their use in rotating equipment, especially equipment which is used in powder applications such as centrifugal pumps and pillow blocks.

2. Description of the Prior Art

An example of a plant, which is often knee-deep in a powder substance around pieces of rotating equipment, is the cement industry. The powder lays adjacent to the rotating equipment bearing chamber, and over time, if the correct seal is not employed, the powder penetrates the bearing chamber leading to premature equipment failure.

Machine tool spindles are another example where the high speed rotation of the spindle leads to premature bearing seal failure, typically because of the use of lip seals, which contact the shaft during operation and quickly wear creating a contaminant entry point.

Rotating equipment is a common generic term for equipment which includes a bearing arrangement typically consisting of at least one bearing which is housed in a bearing cavity or chamber. The bearing is lubricated and sealed between a rotor to stator interface to prevent the ingress or egress of a fluid or solid to the bearing cavity, since such unwanted material results in a reduction of equipment life.

Bearing seals are often also referred to as bearing protectors or bearing isolators. However, the use of such seals extends well beyond the protection of a bearing in rotating equipment. Accordingly, while reference will be made below to bearing protectors, it should be understood that this term is used, as far as the invention is concerned, in connection with seals having such wider uses.

The purpose of a bearing protector is to prevent the ingress of fluid, solids and/or debris from entering a bearing chamber. Equally, bearing protectors are employed to prevent the egress of fluid or solids from a bearing chamber. Essentially, their purpose is to prevent the premature failure of the bearing.

Bearing protectors of the contacting type can be as basic as a lip seal or more complex as in the case of a face/mechanical seal. Reference is made to WO 04/005770, which defines a contacting bearing protector with an axially floating seal face against an axially static seal face.

Contacting bearing protectors often require lubrication at the counter-rotational surfaces. In high shaft speed applications such as machine tool spindles, excessive heat can be created in marginal/zero lubrication. Therefore, while their use in powder applications is clearly preferable, sometimes it is not feasible because of the lubrication requirements of the application.

Non-contacting bearing protectors can be of repeller or labyrinth configuration. Reference is made to WO 06/005950 which discloses a non-contacting bearing protector with a static shut off device.

In a non-contacting bearing protector, the rotating component typically has a complex outer profile which is located adjacent and in close radial and axial proximity to a complex inner profile of the stationary component. Together these complex profiles provide a tortuous path preventing the passage of the unwanted materials or fluids.

Unfortunately, in powder applications, the powder often penetrates the close rotating clearances of conventional labyrinth seal technology, leading to blockage and rotational seizure.

An air purge system can be used to overcome powder entry, but this has a limited effectiveness since, while some of the air acts to blow away the powder from the bearing seal entry point, air is also directed into the bearing chamber. The air is often unclean, and contains moisture and contaminant particles which are clearly undesirable inside the bearing chamber, defeating the whole purpose of using a bearing seal.

Several attempts have been made to provide a non-contacting bearing with an air purge facility but, without the possibility of contaminated air entering the bearing chamber.

Orlowski U.S. Pat. No. 6,062,568, discloses a labyrinth seal with an air inlet, the air travelling through a plurality of passages within the seal, before exhausting to atmosphere. Orlowski relies on an axial locking mechanism to minimise/restrict contaminated air from travelling into the bearing chamber.

Observations on the Orlowski seal include the following:

Injected air, typically at up to 10 psi (0.75 bar) acting on a substantial surface area, creates a considerable thrust force. The rotor in Orlowski has a significant pneumatic surface thrust area, which, when loaded with pressure, in practice acts axially to open the seal from within. This leads to accelerated wear and heat generation of the axial locking member. This in turn increases the axial clearances between the rotor and stator, permitting contaminated air to flow into the bearing chamber. The contaminants cause deterioration of the lubrication media leading to premature bearing failure.

The drain orifice, often positioned at the 6 o'clock on the stator, is directly in-line with the air purge outlet. This means that purging air, is encouraged to exit by the easiest route, the drain orifice, rather than fully purging contaminant located in the close radial clearances between the stator and rotor. Not only is this an ineffective use of the air purge but, the pressure of the air is significantly reduced where it is needed: at the rotor to stator interface. This allows entry of contaminants.

If the air purge is not used, or temporally switched off, as often occurs in plants, the large cavities inside the bearing seal quickly fill up with powder/contaminants which penetrate the radial and axial clearances between the rotor and stator. The considerable clog area of these cavities can lead to seizure of the rotor and premature failure of bearing seal.

A bearing protector with an air purge system should preferably create a substantially zero pneumatic thrust acting to axially extend the seal. This not only eliminates any possibility of accelerated wear between counter rotational components, it also reduces heat build up within the seal. The European machinery directive ATEX deals with temperature limits of components in contact with the atmosphere, if explosive substances are being processed. A bearing seal which can operate at relatively low temperatures is preferred.

Plant air pressurise can vary considerably depending on equipment location and pipe restrictions from the air source. High-pressure air travelling through small outlet orifices could be dangerous and/or damaging to the equipment. Equally, low pressure air travelling through substantially large outlet orifices can be ineffective at removing contaminants. Pressure control is desirable.

Purging air through the rotor to stator interface is a desirable feature for the efficient and effective use of an external air purge system. It is desirable that the 6 o'clock drain hole within the bearing protector stator is out-of-line with the flow of air through the bearing seal.

There should desirably be a minimisation of the likelihood of rotor clogging and seizure, in periods where air is not employed. This is particularly relevant when processing powders which solidify with vapour.

SUMMARY OF THE INVENTION

According to the present invention there is provided a bearing protector device, with an air purge mechanism. Said bearing seal comprises of a rotor member, connected to the equipment shaft and a stator member connected to the equipment housing. The device includes an air inlet and an air outlet and, extending therebetween, an air passage which is defined at least partially by circumferentially extending stator and/or rotor surfaces.

Preferably, the stator incorporates an orifice, which permits the attachment of an air supply line.

Preferably, the air purge mechanism comprises a self-compensating air supply regulator device, located adjacent a circumferential air distribution cavity and substantially adjacent to one or more communication orifices.

Preferably, said communication orifice(s) are located adjacent to the rotor to stator interface, which communicates to the atmospheric side of the bearing protector. Preferably, said communication orifice(s) are adjacent to an inclined rotor surface, with the radially larger end preferably adjacent to the atmospheric side.

Preferably, the self-compensating air supply regulator device comprises a solid deformable toroid, which is radially captive on its outer and innermost circumference by the stator. Said toroid is preferable axially abutted to at least one small radial shoulder in said stator groove, and is adjacent to the communication orifice.

Preferably, the rotor member is axially restricted to the stator member by an axial restriction member, which is axially located and extends radially beyond a groove in one of the members, and projects in close proximity against an annular surface of the corresponding member.

Preferably, a rotor to stator contacting seal member is provided, comprising a solid deformable toroid with a low friction co-efficient. Said contacting seal member is preferably located on a pair of inclined, substantially parallel surfaces on the stator member. Said inclined surfaces are preferably radially smaller adjacent to the rotor. Preferably, said contacting seal member is circumferentially stretched during assembly onto the stator, thus naturally is urged down the incline towards the smallest radial point, by the natural elasticity of its material of construction.

Preferably the rotor member is mounted in a frictional sealing engagement with the shaft by one or more elastomeric members. Said elastomeric member transmits the rotary motion from the shaft to the rotor member.

Preferably, the rotor member, houses a rotor to stator sealing device which, provides sealing integrity of the bearing seal between the rotor and stator when the equipment is idle. Preferably, said sealing device is an elastomeric member which disengages from the stator when the equipment is operational.

Preferably the rotor is positioned adjacent to the stator member. Preferably the rotor is axially coupled to the stator, by an axial restraint member. Preferably, said axial restraint member has a circumferentially continuous surface in close proximity to a circumferentially continuous surface of the stator member and circumferentially continuous surface of the rotor member.

Preferably, the stator is sealingly connected to the equipment housing, by an elastomeric member. Preferably the stator is rotationally coupled to said equipment housing.

Preferably, said stator has a radially extending cavity, on its inner most radial surface adjacent to the rotor and/or shaft. At the approximate 6 o'clock position, said radial cavity is interrupted with an orifice that communicates with the bearing chamber of the rotating equipment.

Preferably, at the approximate 6 o'clock position, the outer most radial surface of the stator is interrupted with an orifice that communicates with the atmospheric side of the bearing chamber of the rotating equipment and an inner radial surface of the stator. Preferably, the inner radial surface communication occurs in a stator cavity which is not directly in line with the air stream.

BRIEF DESCRIPTION OF THE DRAWING FIGURES

Figure 2:
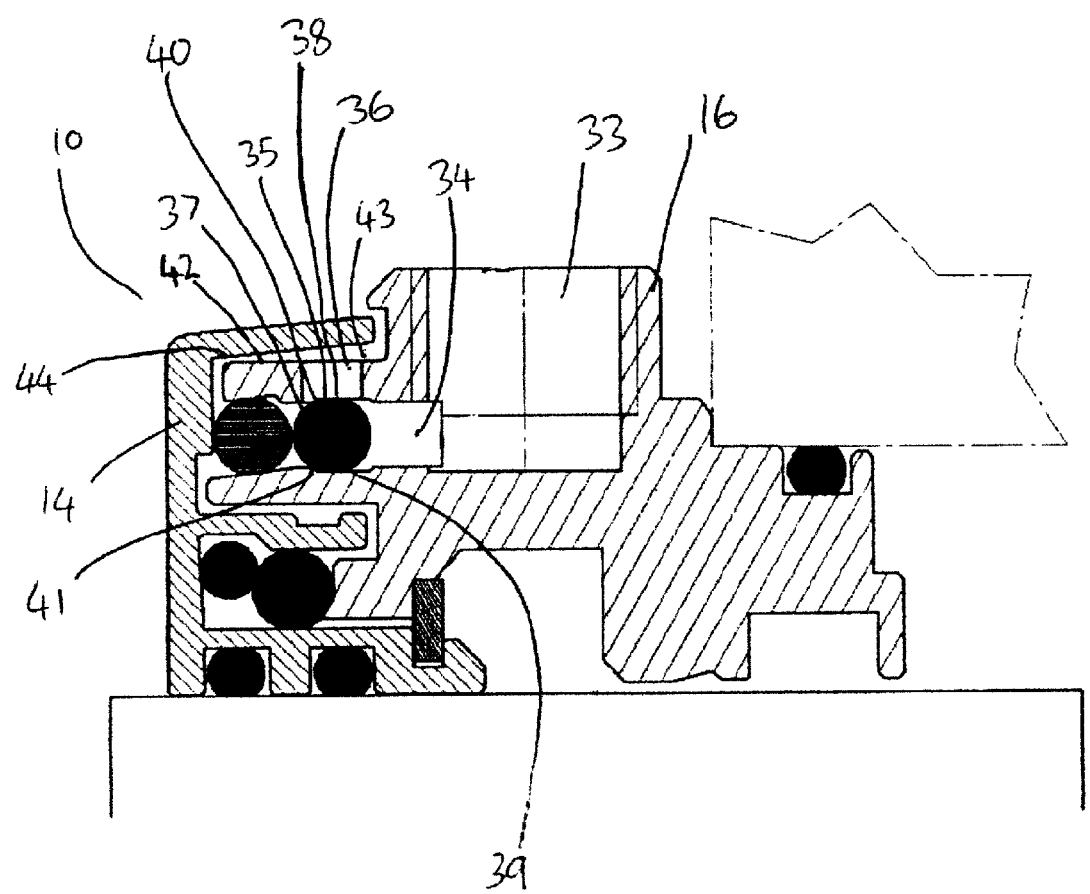
Figure 3:
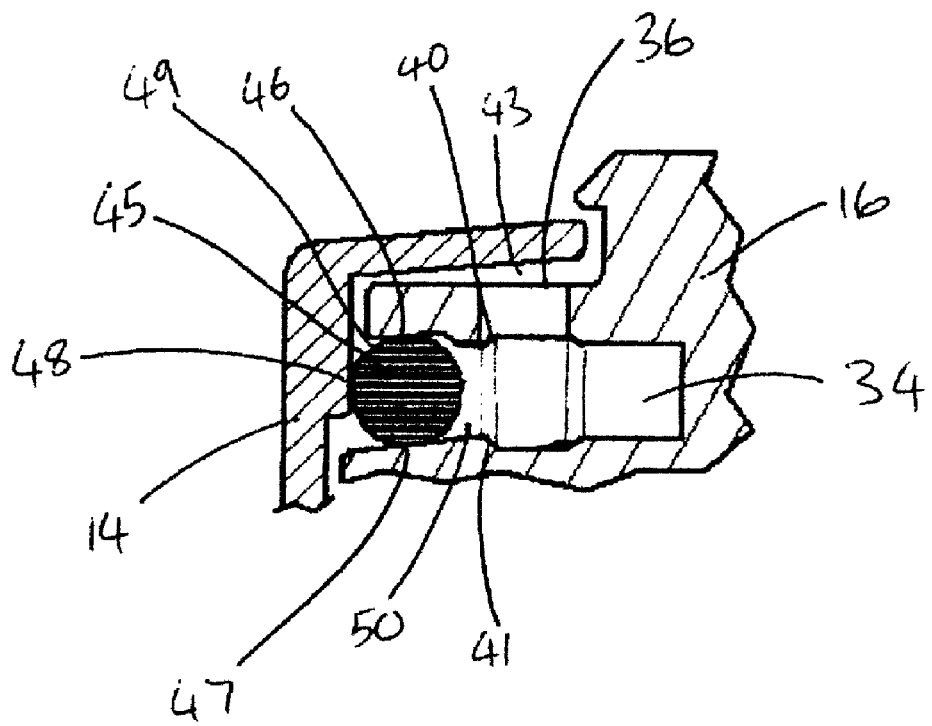
Figure 4:
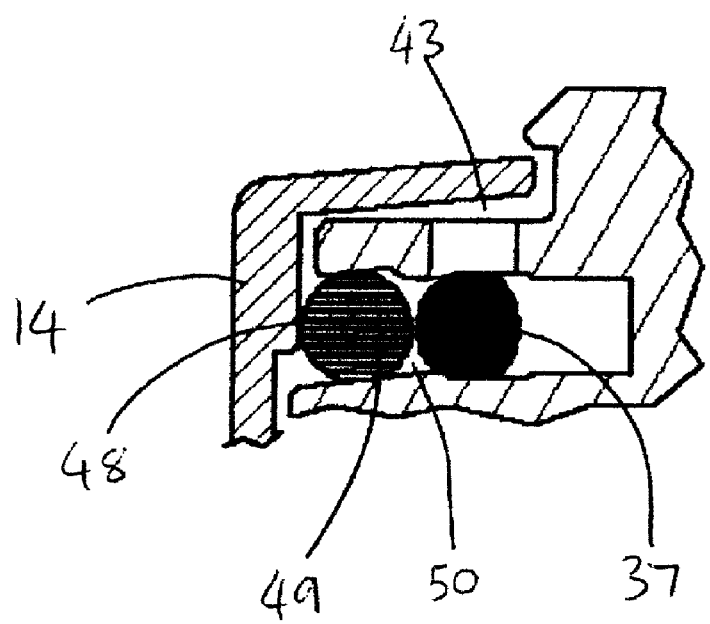
Figure 5:
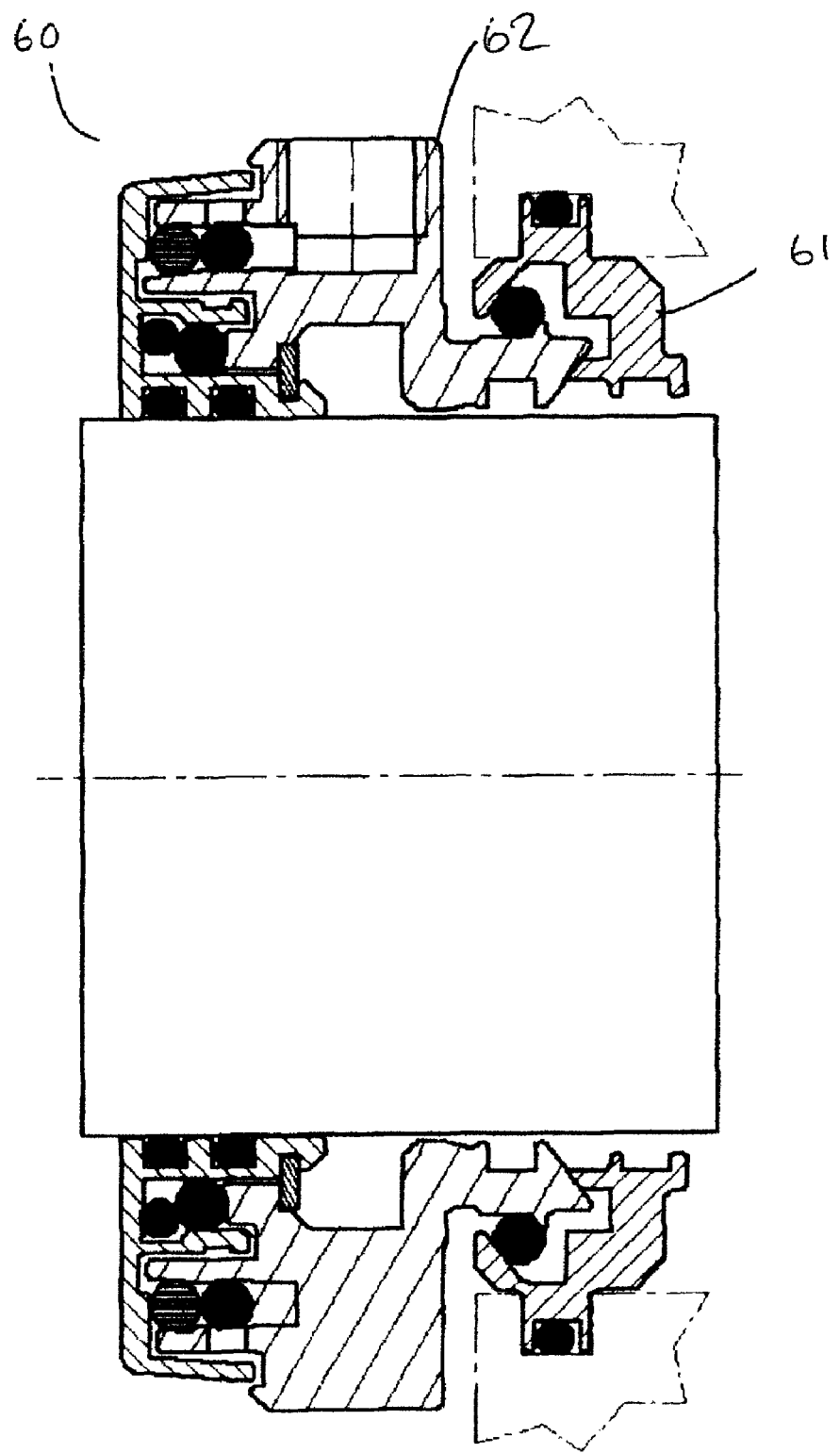
Figure 6:
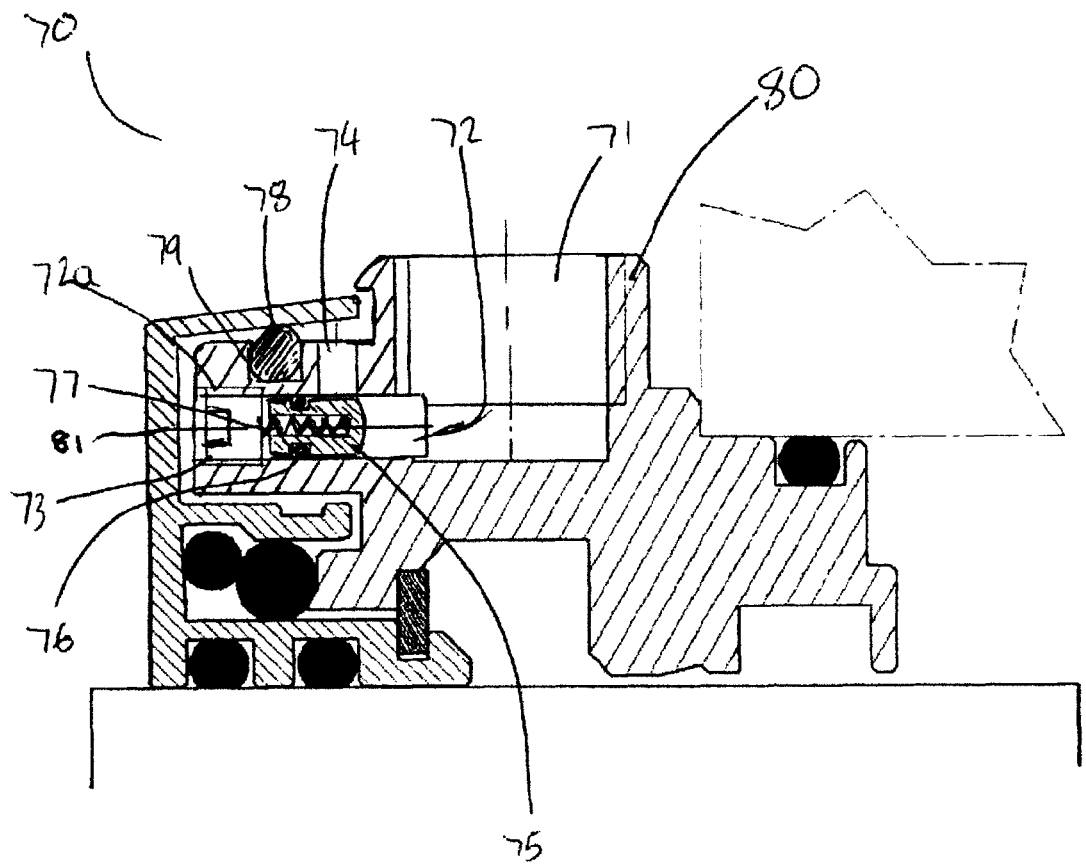

The accompanying drawings are as follows:

FIG. 1 is a longitudinal sectional view of a labyrinth seal bearing protector of the invention;

FIG. 2 corresponds to FIG. 1, and is an enlarged partial longitudinal sectional view of a labyrinth seal bearing protector of the invention;

FIG. 3 corresponds to FIGS. 1 and 2, and is an enlarged partial longitudinal sectional view of the stator groove which houses the self-compensating air supply regulator device;

FIG. 4 corresponds to FIGS. 1 and 2, and is an enlarged partial longitudinal sectional view of the self-compensating air supply regulator device;

FIG. 5 is a longitudinal sectional view of a labyrinth seal bearing protector of the invention, mounted in a self-alignment stator; and, FIG. 6 is a longitudinal sectional view of an alternate labyrinth seal bearing protector of the invention.

DETAILED DESCRIPTION OF THE DRAWING AND PREFERRED EMBODIMENTS

The invention will now be described, by way of examples only, with reference to the accompanying drawings.

The general principle of rotary seals in accordance with the present invention may be used not only in the case where the shaft is a rotary member and the housing is a stationary member but also the reverse situation, that is to say, in which the shaft is stationary and the housing is rotary.

Furthermore, the invention may be embodied in both rotary and stationary arrangements, cartridge and component seals with metallic components as well as non-metallic components.

Referring to FIG. 1 of the accompanying drawings, a bearing protector 10 of a first embodiment of the invention is mounted in an item of rotating equipment assembly 11.

Assembly 11 includes a rotating shaft 12 and a stationary equipment housing 13. The equipment housing 13 typically contains a bearing (not shown), mounted in the radial space between the shaft 12 and housing 13.

Area "X", adjacent to the bearing (not shown) and at one axial end of the bearing protector assembly 10, typically contains bearing lubrication fluid, yet could also contain solid and/or foreign debris and/or atmosphere. For clarity it will herein be termed "product substance", being used to describe a single or mixed medium.

Area "Y" at the other axial end of the bearing protector assembly 10 could also partially contain fluid, typically sprayed moisture, and/or solids and/or foreign debris and/or atmosphere. However, it will herein be termed "atmospheric substance" being used to describe a single or mixed medium.

The bearing protector assembly 10 includes a rotor member 14, which is radially and axially adjacent to stator member 16.

The stator member 16 is preferable rotationally attached to the equipment housing 13 being in sealing engagement effected by elastomer member 17.

The rotor 14 is radially mounted in sealing engagement with shaft 12 by at least one elastomeric member 18. The frictional squeeze on said elastomer 18 is typically sufficient to transmit the rotational drive from the shaft 12 to the rotor 14. Clearly, a separate drive mechanism could be employed to transmit said drive if so required.

The static shut off device 19, which seals the rotor to stator when the shaft is at rest/idle and provides a non-contact seal when the shaft is in operation, is described in WO 06/005950 and will not be further described. A seal of the present invention may be provided with or without such a static shut off feature or an equivalent.

The rotor 14 is longitudinally restrained to the stator 16 by a longitudinal restraining member 20, which is itself longitudinally restrained and which radially extends from a groove 21 in rotor 14. Preferably, said restraining member 20 is provided in a material with a low co-efficient of friction and is positioned adjacent to an annular surface 22 of stator 16. Rotor 14 is provided with an inclined surface 23. Adjacent to said restraining member 20, stator 16 is provided with a longitudinally and radially extending cavity 24 on its innermost radial surface. Together, the stator cavity 24 and rotor inclined surface 23 facilitate the fitting of the axial restraining member 20 into the rotor groove 21.

While the longitudinal restraining member 20 is shown in FIG. 1 as a separate component inserted in rotor groove 21, it is highly feasible and practical to configure the rotor 14 end so to be mechanically deformable to provide an integral radial abutment to the stator annular face 22, thus providing longitudinal restrainment.

Preferably, stator 16 incorporates a radially extending groove 28 extending from its innermost circumference, and substantially adjacent to the rotor or shaft 12 as shown. Preferably, said groove is positioned adjacent to area "X" and the sealed media in the equipment bearing chamber 11. Preferably said groove 28 is circumferentially interrupted at the 6 o'clock position by an orifice 29 which communicates between area "X" and the outermost radial surface of the groove 28.

Preferably, the outermost radial surface of the stator 16 is preferably circumferentially interrupted at the 6 o'clock position by an orifice 31 which communicates between area "Y" and an inner radial surface of the stator 16. Preferably said stator radial surface is adjacent to stator groove 32.

Preferably, stator 16 includes a radially extending orifice 33 which communicates with a longitudinally extending circumferential groove 34 containing a self-compensating air supply regulator device 35 adjacent to at least one radial communication orifice 26 in stator 16. The regulator device 35 will be further described below with reference to FIG. 2.

Advantages of the above described embodiment of the invention over that of the prior art, include;

The small pneumatic surface thrust area "A" over which the air pressure acts. This reduces wear of and heat generation by the longitudinal restraining device 20 thus increases seal life.

The 6 o'clock drain orifice 31, which is not sited in the direct flow of air between the inlet orifice 33 and rotor to stator interface 43.

An air purge bearing protector assembly 10 with an integral static shut-off device 19, which permits bearing chamber gases to escape from the bearing chamber but does not allow moisture to enter when the equipment is idle.

Referring to FIG. 2, the self-compensating air supply regulator device 35 comprises a solid deformable toroid 37 which is radially captive within a circumferential groove 34 extending longitudinally within stator 16. Toroid 37 is longitudinally abutted to at least one radially extending shoulder 40 in longitudinal groove 34 extending between shoulders 40 and 41. Preferably, a second radially extending shoulder 41 in said stator axial groove 34 is also included, so that toroid 37 is abutted equally on its inner and outer surfaces.

The outermost radial surface 38 of toroid 37 is adjacent to at least one circumferential interruption, which is a communication orifice 36 from the stator radial surface 42 to groove 34. Preferably, a plurality of communication orifices 36 are equally distributed around the circumference of the stator 16.

In operation, air is applied through orifice 33 and circumferentially distributed in groove 34. The air pressure axially forces toroid 38 to deform slightly and press against radial shoulders 40 and 41.

As the toroid 37 is adjacent and partly blocks the stator communication orifice(s) 36, air is permitted to bleed out, past the toroid 38 and into the radial gap 43 between the rotor and stator. By design, under normal air pressure (2-5 psi) the size of orifice 36 is such that a sufficient stream of air is provided to remove contaminant from the stator to rotor interface (gap).

The greater the air pressure, for instance, an air pressure of about 10 psi, the higher the longitudinal force applied on the toroid 38, the greater the toroid 38 deformation. This increased deformation increases the size of the entrance to communication orifice 36 and thus reduces the outlet pressure back to that giving the desired/ideal contaminant removal stream.

The smaller the air pressure, for instance, 0.5-1 psi, the lower the axial force applied on the toroid 38 and the lower the toroid 38 deformation. This reduced deformation reduces the size of the entrance to communication orifice 36 and thus increases the outlet pressure back to that giving the desired/ideal contaminate removal stream.

The self-compensating air supply regulator device 35 thereby compensates for variations in plant air pressure, providing a constant, circumferentially distributed, optimised delivery of air pressure/volume at the rotor to stator interface.

Air entering the rotor to stator interface 43 may disperse in either longitudinal direction; the first out of the bearing protector 10 to atmosphere, and the second, into the bearing protector 10 towards the bearing chamber. The later is undesirable.

The rotor 14 includes an innermost radial surface 44 which is inclined. This inclined surface is adjacent to an outer radial surface 42 of stator 16, which is substantially parallel to the shaft. These inclined and non-inclined surfaces create a substantially conical rotor to stator interface gap, where the smallest cross section of the cone is adjacent to the bearing chamber access and the largest cross section of the cone is adjacent to the atmospheric access. The conical cross section of the rotor to stator interface 43 creates high and low pressure regions.

As air is exhausted from orifice 36 it naturally travels to the low pressure region, adjacent to the atmosphere.

The possibility remains, however, that air could still enter the bearing chamber.

Referring to FIG. 3, a second deformable toroid member 45 is radially restrained by the stator 16 on both its outermost surface 46 and innermost surface 47. Toroid 45 is in sealing engagement with stator surfaces 46 and 47 and also makes longitudinal sealing engagement with rotor surface 48.

Stator surfaces 46 and 47 are substantially parallel to each other and inclined to the shaft axis (not shown). The gap between the surfaces 46 and 47 is radially smaller adjacent to the rotor 14 and radially larger adjacent to the communication orifice 36 in stator groove 34.

Toroid 45 is made from a low friction co-efficient material and is of a size such that it is circumferentially stretched into its working position in the stator 16. Thus, the natural elasticity of the toroid 45 encourages it to move radially down the inclined surfaces 46 and 47 and maintain light sealing engagement with the rotor 14. If counter rotational surfaces cause the toroid 45 to wear at contact point 48, the sealing integrity between the rotor 14 and stator 16 is maintained given the inclined surfaces 46 and 47.

This sealing engagement provides a dead-end for air entering the conical rotor to stator cavity 43, encouraging the air to evacuate to atmosphere, not into the bearing chamber.

The possibility, albeit small, remain, that air could still enter the bearing chamber because air, under high pressure acting over the toroid area 49, may provide sufficient pneumatic lift of toroid 45 to permit a very small amount of air to enter the bearing chamber.

The communication orifice 36 breaks into the circumferential cavity 50, longitudinally spaced displaced from radial shoulders 40 and 41, thus permitting a small amount of air to bleed into said cavity 50.

As toroid 37 separates the main air flow from cavity 50, the air in cavity 50 is at a lower pressure than the delivered air pressure. This lower pressure air in cavity 50 acts over the cross sectional area of toroid 49 which in turn creates a longitudinal thrust force encouraging toroid 45 to maintain sealing contact with the rotor 14 at rotor surface 48. This air bleed and pneumatic thrust overcomes any possibility that air in the conical cavity 43 will act to open sealing surface 48 permitting air to flow into the bearing cavity. The design also further accommodates for any wear occurrence at the counter rotational sliding surface 48.

Referring to FIG. 5, a labyrinth seal bearing protector 60 is mounted in a self-alignment stator 61 described in GB 0606068.5.

Accordingly, FIG. 5 illustrates a different configuration of stator 62 which can accommodate the air purge system of the present invention.

Referring to FIG. 6, of an alternative labyrinth seal bearing protector 70 has an air inlet radial communication orifice 71 which communicates with a longitudinal orifice 72. This orifice 72 is tapped at 72a to accept a set-screw 73. Stator communication orifice 74 is blocked by a plunger 75, which is sealed via a suitable means 76 to hole 71. The plunger is longitudinally spring energised 77 towards the air supply inlet.

A toroid 78 is inserted into a radially extending groove 79 in stator 80. This toroid is in sealing engagement with rotor 81.

Various other air purge configurations may be provided, including those air inlet orifices which are integral to the bearing protector stator, as shown, or systems which have an appropriate air inlet orifice in the rotating equipment housing.

Embodiments of the invention such as those described above may be employed to seal rotating equipment operating in difficult applications such as power processing, and/or marginal lubrication/high shaft speed applications such as machine tool spindles.

What is claimed is:

1. A seal device, comprising:
   a stator which locates into a housing of a piece of rotating equipment;
   a rotor which locates on a shaft of the piece of rotating equipment;
   axial restraining means between said rotor and stator;
   an air inlet and an air outlet and, extending therebetween, an air passage, said air passage being defined, at least partially, by circumferentially extending surfaces of, at least one of, said stator and said rotor surfaces; and,
   a rotor-to-stator contacting seal member in the form of a deformable toroid provided in the air passage, said rotor-to-stator contacting seal member is located on a pair of inclined, substantially parallel surfaces on said stator, wherein said pair of inclined, substantially parallel surfaces provide a radially smaller gap adjacent to said rotor and said rotor-to-stator contacting seal member is circumferentially stretched during assembly onto said stator, being urged down an incline created by said pair of inclined, substantially parallel surfaces towards a smallest radial gap.

2. The seal device according to claim 1, wherein an outermost radial surface of said stator is circumferentially interrupted by an orifice which communicates between an atmospheric side of said seal device and an inner radial surface of said stator for providing a communication path in indirect communication with said air passage.

3. The seal device according to claim 2, wherein at least one said orifice that communicates between the atmospheric side of said seal device and the inner radial surface of said stator is adjacent to an inclined rotor surface, with a radially larger end adjacent to the atmospheric side.

4. The seal device according to claim 3, wherein said inclined rotor surface corresponds to a substantially non-inclined surface of said stator, thereby creating a conical cavity between a rotor to stator interface.

5. The seal device according to claim 1, wherein the air passage includes a self-compensating air supply regulator, said air supply regulator being located adjacent to at least one orifice which communicates to the atmosphere.

6. The seal device according to claim 5, wherein said air supply regulator comprises of a stator orifice blocking member which responds to an unblocking an orifice of said stator when air pressure is applied.

7. The seal device according to claim 6, wherein said air supply regulator is located adjacent to a circumferential air distribution cavity, said circumferential air distribution cavity connecting at least one orifice that communicates to the atmosphere.

8. The seal device according to claim 7, wherein said air supply regulator comprises a radially captive deformable toroid member, said toroid member being located in a cavity of said stator and connected by at least one orifice providing communication from the cavity of said stator to the atmosphere.

9. The seal device according to claim 8, wherein said deformable toroid member is axially supported by at least one radially extending shoulder of said stator.

10. The seal device according to claim 6, wherein said stator orifice blocking member permits air to bleed to an opposite longitudinal side of said stator orifice blocking member.

11. The seal device according to claim 1, further comprising at least one solid deformable toroid member adjacent said rotor and said stator, said toroid member sealingly engaging said rotor and said stator when the shaft of the rotating equipment is idle and sealingly disengaging at least one said rotor or said stator when the shaft is rotating.

12. The seal device according to claim 1, wherein said axial restraining means is that of a circumferentially continuous surface in close axial proximity to a circumferentially continuous surface of, at least one of, said stator and said rotor.

13. The seal device according to claim 1, further comprising at least one radially extending cavity, substantially adjacent to, at least one of, said stator and said rotor, and adjacent to a sealed media of the piece of rotating equipment.

14. The seal device according to claim 13, wherein said radially extending cavity is circumferentially interrupted by an orifice communicating between the sealed media and an outermost radial surface of the radially extending cavity.

15. The seal device according to claim 1, wherein said rotor is in sealing engagement with the shaft of a piece of rotating equipment via at least one solid deformable toroid member.

16. The seal device according to claim 1, further comprising a first sealing member between said rotor and said stator has a substantially lower friction coefficient than a friction coefficient between a second sealing member located between the rotor and the equipment shaft.

17. The seal device according to claim 1, further comprising at least one solid deformable toroid member in sealing engagement between a seal of said stator and a housing for the piece of rotating equipment.

\* \* \* \* \*